Figure 1:
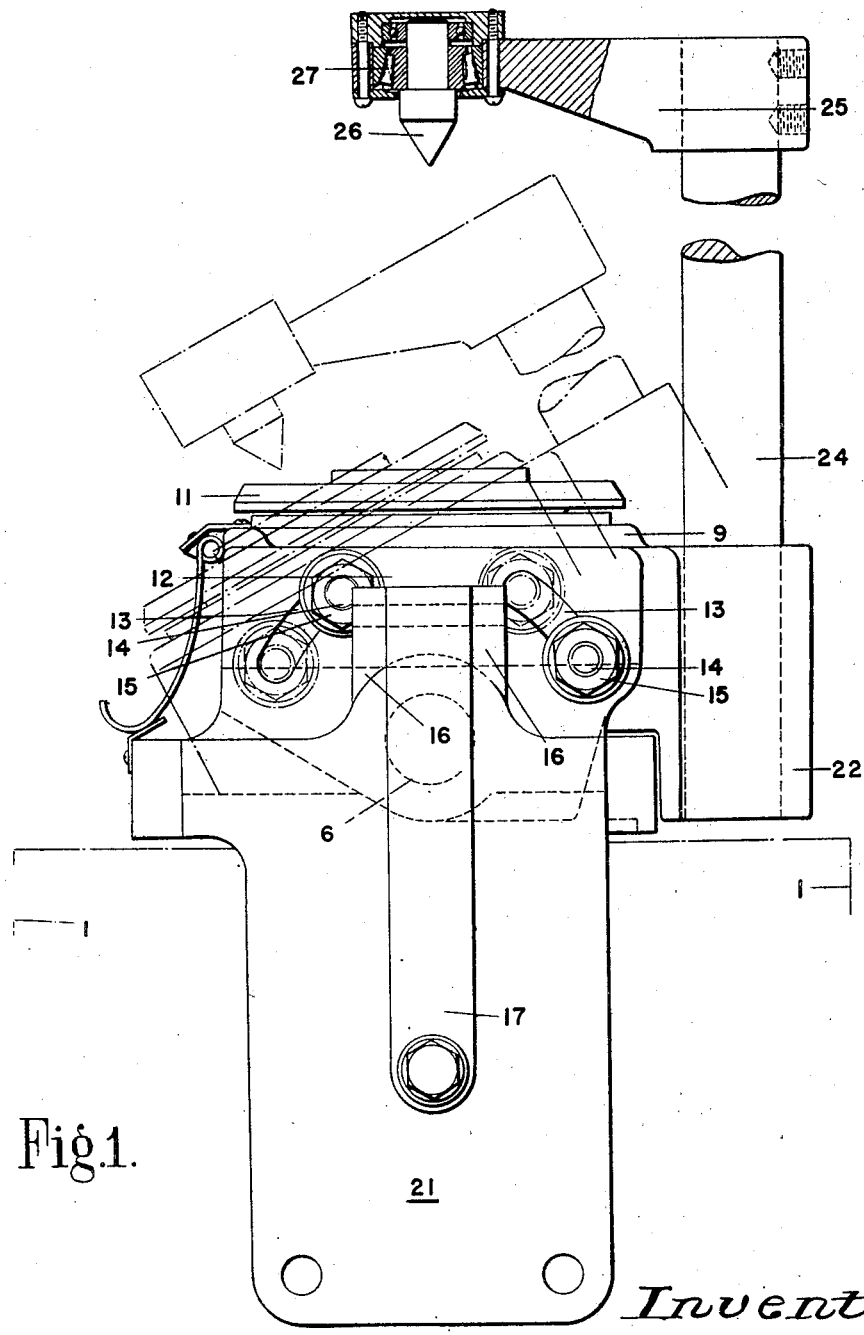

Oct. 24, 1950  G. BARRETT  2,526,798
GEAR HOBBING MACHINE
Filed June 5, 1947  3 Sheets-Sheet 1

Inventor
G. Barrett
By Clarence Downing Rechtold
Attys

Oct. 24, 1950 G. BARRETT 2,526,798
GEAR HOBBING MACHINE
Filed June 5, 1947 3 Sheets-Sheet 2

Inventor
G. Barrett
By Glaser & Downing & Seebold
Attys.

Oct. 24, 1950   G. BARRETT   2,526,798
GEAR HOBBING MACHINE
Filed June 5, 1947   3 Sheets-Sheet 3

Inventor
G. Barrett
By Glascock Downing Seebold Attys.

Patented Oct. 24, 1950

2,526,798

UNITED STATES PATENT OFFICE 2,526,798

GEAR HOBBING MACHINE

Guy Barrett, Bosham, near Chichester, England, assignor, by mesne assignments, to Varatio-Strateline Gears Limited, Slough, England Application June 5, 1947, Serial No. 752,639
In Great Britain June 28, 1946

5 Claims. (Cl. 90—4)

This invention relates to cutting teeth on conical blanks for the production of wheels adapted more particularly for use in variable speed gear of the character described and claimed in British specification No. 539,062 and United States specifications Nos. 1,817,819 and 2,273,404.

The manufacture of such wheels is a matter of extreme difficulty and is accompanied by an undesirable degree of inaccuracy as hitherto practised and the object of the invention is to provide a method of and means for producing wheels of this character with greater facility, uniformity and accuracy by the use of a hobbing machine.

According to the invention on the table of the hobbing machine is secured centrally a bevel wheel arranged to drive through one or other and normally both of a pair of bevel pinions rotatable about a common axis extending diametrically with respect to the bevel wheel, a second bevel wheel mounted in a housing capable of being inclined about an axis perpendicular to the axis of rotation of the table of the hobbing machine and secured to a work table with which the blank to be operated upon by the hob is engaged so that by the inclination of the axis of rotation of the second-mentioned table with respect to the axis of rotation of the table of the hobbing machine, the axis of the blank may be set at the desired angle with the plane containing the axis of rotation of the hob.

The pair of bevel pinions provided are in fact planetary pinions and either one or other member and normally both of the pair is employed in transmitting motion from the main table to the table to which the blank is secured.

To enable the drive to be effected through one or other bevel pinions of the pair, the pinions are associated with means whereby driving connection between one or other of them and the two bevel wheels may be interrupted.

For instance, the pair of bevel pinions may be mounted upon shafts arranged to be slid axially to bring one or other of the bevel pinions into and out of engagement with the bevel wheels.

To enable either the one or other of the pair of bevel pinions to be maintained in or released from engagement with the bevel wheels with the shafts on which the pinions are mounted, there may be associated pivoted arms adapted to be swung into and out of position to engage the ends of the shafts and thus maintain the driving engagement of the desired pinion and the bevel wheels.

The housing for the bevel wheel which is driven by the planetary pinions and supports the work table is conveniently furnished with lugs which provide a pivotal mounting for it upon the shafts of the bevel pinions, the shafts being slidably engaged in a sub-frame rigidly connected with the main frame of the hobbing machine and for engaging the housing in the position into which it is rotated about the axes of the shafts of the bevel pinions, slots may be provided in the sub-frame through which extend studs engaged by nuts.

By suitable setting of this work table gear wheels can be cut to form a section of a cone having the desired angle and the teeth will have the form described in the prior specifications, the pitch line running at an angle to the top and to the root of the tooth, the thickness of the tooth being the same at all points on the pitch line but with the addendum constantly increasing and the dedendum per contra constantly decreasing along the pitch line.

The invention will be described further in detail and by way of example with reference to the accompanying drawings, in which—

Figure 2:
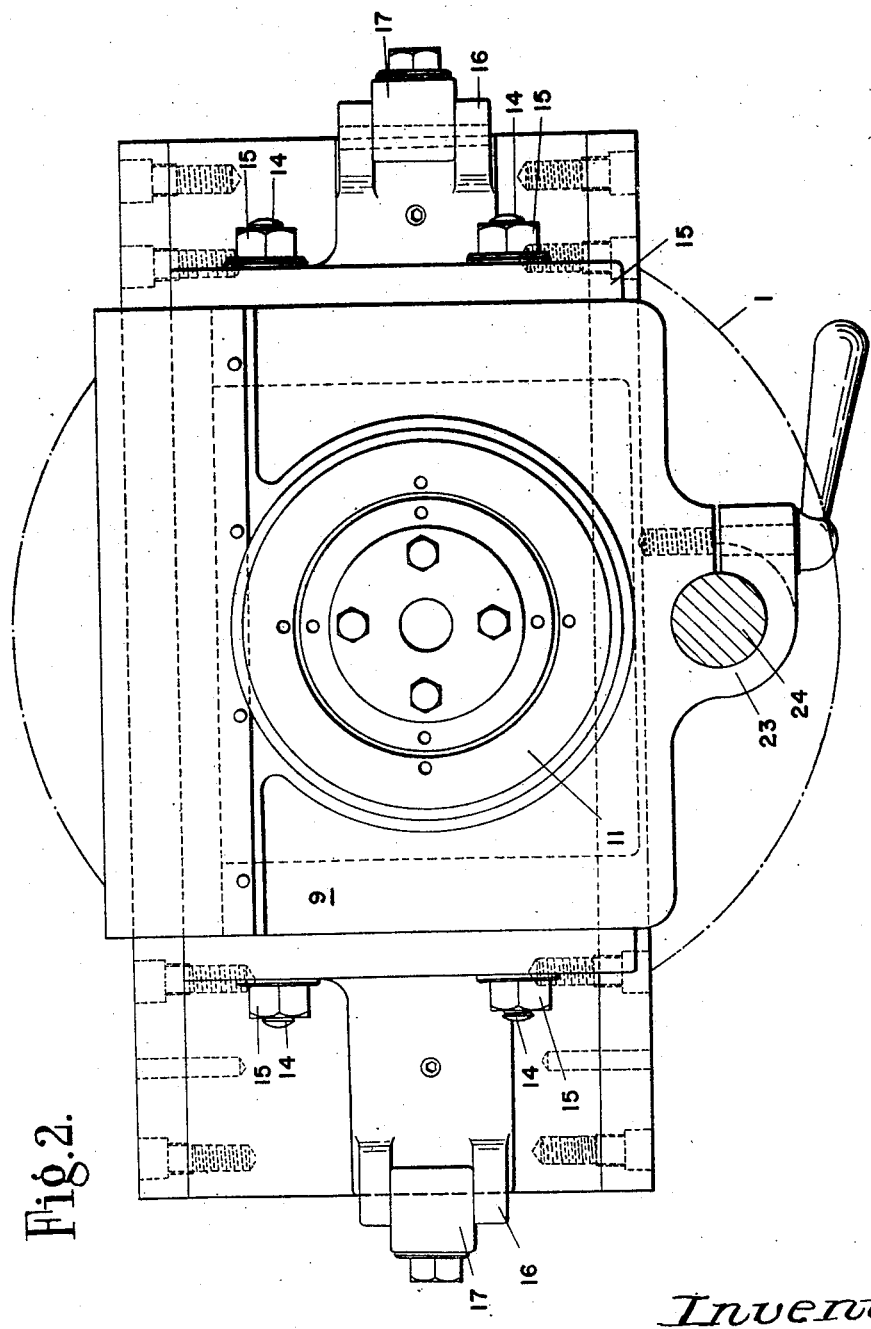
Figure 3:
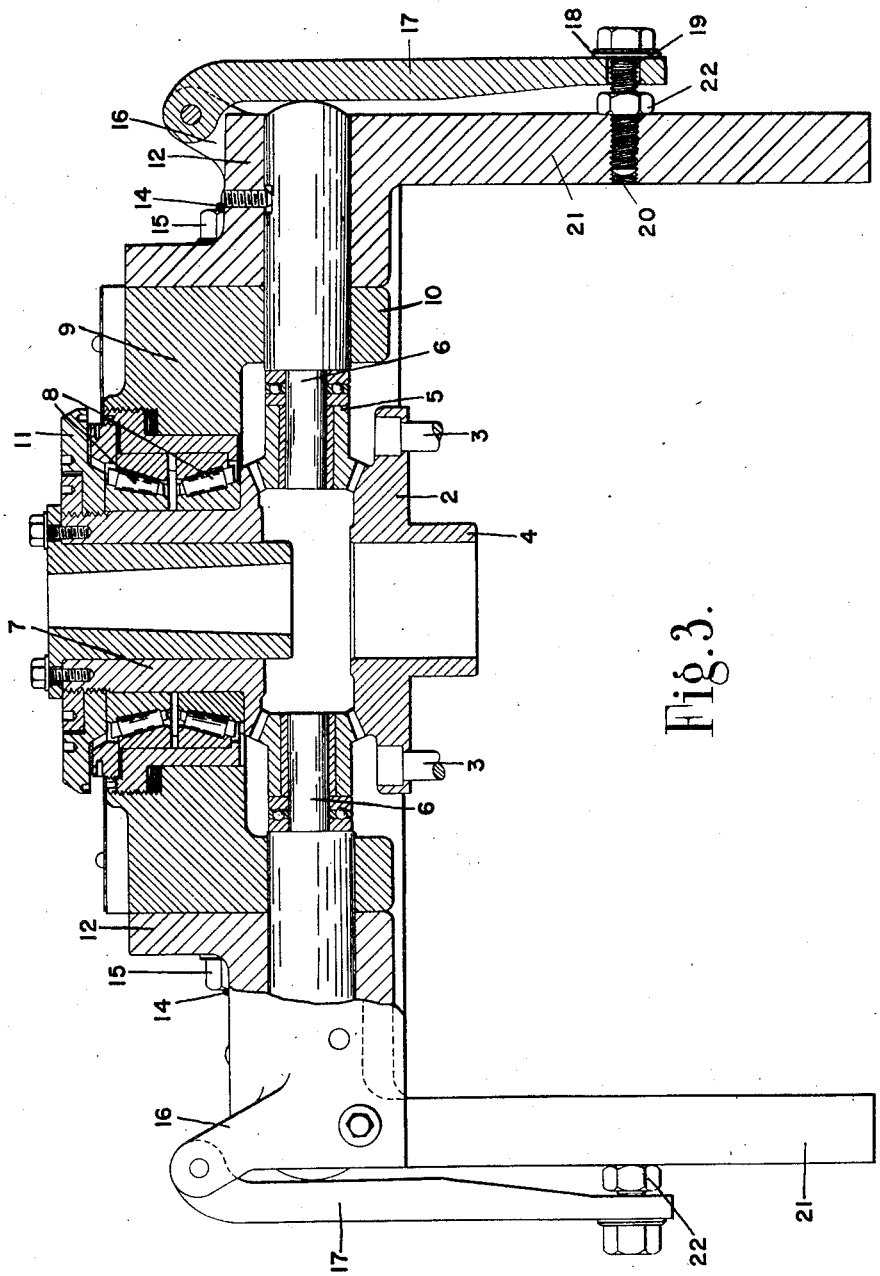

Figure 1 is a view in elevation showing the essential details of the means in accordance with the invention which are applied to a hobbing machine, Figure 2 is a plan view thereof, and Figure 3 is a view in elevation and in section in a plane at right angles to the plane of view of Figure 1.

As shown in the drawings, on the table of a hobbing machine the frame of which is indicated in chain dotted line by the reference 1 in Figure 1, there is secured, see Figure 3, a bevel wheel 2 by bolts 3, the bevel wheel being centrally located by the engagement of its boss 4 in the arbor hole of the table.

This bevel wheel is arranged to drive through one or other and normally both of a pair of bevel wheels 5 functioning as planetary pinions rotatable about a common axis extending diametrically with respect to the bevel wheel 2 and mounted on shafts 6, a second bevel wheel 7 mounted in bearings 8 in a housing 9 furnished with lugs 10 which provide a pivotal mounting for it upon the shafts 6 about which the bevel pinions rotate so that the housing is capable of being inclined about an axis perpendicular to the axis of rotation of the table of the hobbing machine.

With the second bevel wheel 7 there is secured a work table 11 with which the blank to be operated upon by the hob is engaged so that by the inclination of the axis of rotation of the second-mentioned table with respect to the axis of rotation of the table of the hobbing machine, the axis of the blank may be set at the desired angle with the plane containing the axis of rotation of the hob.

The shafts 6 are slidably engaged in a sub-frame 12 rigidly connected with the main frame of the hobbing machine so that the engagement between one and the other of the bevel pinions and the bevel wheels may be interrupted to enable the table and the housing 9 to be rotated into the desired position about a horizontal axis, namely the axis of the shafts, and for securing the housing in the position into which it is so rotated slots 13 are provided in the sub-frame through which extend studs 14 secured to the housing and engaged by nuts 15, see Figure 2.

On the sub-frame there are provided lugs 16 with which are pivotally connected arms 17 adapted to be swung into and out of position to engage the ends of the shafts and in the former case to maintain the driving engagement of the desired pinion of the bevel wheels, slots 18 being provided on these arms through which pass screws 19 adapted to engage internally screw-threaded holes 20 in arms 21 extending from the sub-frame and to be locked in position by the lock nuts 22.

The housing 9 is provided with an extension 23 in which a pillar 24 is engaged and on this pillar is provided a bracket or arm 25 furnished with a running centre 26 engaged in roller bearings 27 in the end of the arm.

The provision of two planetary bevel pinions as described above and their employment conjointly in securing a driving connection between the two bevel wheels provides means whereby the amount of backlash in the gear train as a whole can be maintained at the minimum permissible for practicable working.

I claim:

1. A hobbing machine for use in cutting teeth on conical blanks for the production of conical toothed wheels comprising, a table, a driving bevel wheel secured centrally on the table, a rigid frame, aligned shafts slidably mounted in said frame, a pair of beveled pinions each mounted on one of said shafts and both rotatable about a common axis extending diametrically with respect to the bevel wheel for removable meshing engagement therewith, a housing pivotally mounted on said shafts and oscillatable about an axis perpendicular to the axis of rotation of the table, a work table rotatably mounted on the housing and upon which the blank to be operated upon by a hob is engaged, said work table including a second bevel wheel for engagement with the bevel pinions so that by the inclination of the axis of rotation of the second mentioned table with respect to the axis of rotation of the first mentioned table the axis of the blank may be set at the desired angle with the plane containing the axis of rotation of a hob that is to work on the blank.

2. A hobbing machine as defined in and by claim 1 wherein the shafts carrying the bevel pinions are selectively axially adjustable so that driving engagement therebetween and the two bevel wheels may be optionally controlled.

3. A hobbing machine as defined in and by claim 1 wherein to provide selective control of engagement of the bevel pinions with the bevel wheels, pivoted arms are mounted on the frame and adapted to be swung into and out of position to engage the ends of the shafts carrying the bevel pinions and thus maintain the driving engagement of the desired pinion and the bevel wheels.

4. A hobbing machine as defined in and by claim 1 wherein to provide selective control of engagement of the bevel pinions with the bevel wheels, pivoted arms are mounted on the frame and adapted to be swung into and out of position to engage the ends of the shafts carrying the bevel pinions and thus maintain the driving engagement of the desired pinion and the bevel wheels, and adjustable locking means are disposed between and in operable connection with the outer ends of the arms and the frame to adjustably lock the arms in engagement with the ends of the shafts.

5. A hobbing machine as defined in and by claim 1 wherein the said housing that supports the work table is provided with depending lugs constituting a pivotal mounting therefor upon the shafts carrying the bevel pinions, the said shafts being slidably engaged in the frame.

GUY BARRETT.

REFERENCES CITED

The following references are of record in the file of this patent:

UNITED STATES PATENTS

| Number | Name | Date |
|---|---|---|
| 656,166 | Bilgram | Aug. 21, 1900 |
| 912,349 | Yates | Feb. 16, 1909 |
| 936,879 | Flather | Oct. 12, 1909 |
| 1,335,472 | Williams | Mar. 30, 1920 |
| 1,516,477 | Schofield | Nov. 18, 1924 |

FOREIGN PATENTS

| Number | Country | Date |
|---|---|---|
| 379,478 | Germany | Aug. 23, 1923 |